United States Patent
Anisimovskiy et al.

(10) Patent No.: US 12,223,628 B2
(45) Date of Patent: Feb. 11, 2025

(54) ELECTRONIC DEVICE FOR PERFORMING IMAGE DEBLURRING AND CONTROLLING METHOD OF ELECTRONIC DEVICE

(71) Applicant: SAMSUNG ELECTRONICS CO., LTD., Suwon-si (KR)

(72) Inventors: Valery Valerievich Anisimovskiy, Moscow (RU); Maksim Alexandrovich Penkin, Moscow (RU); Evgeny Andreevich Dorokhov, Moscow (RU); Aleksei Mikhailovich Gruzdev, Moscow (RU); Sergey Stanislavovich Zavalishin, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 229 days.

(21) Appl. No.: 17/364,274

(22) Filed: Jun. 30, 2021

(65) Prior Publication Data
US 2022/0005160 A1    Jan. 6, 2022

(30) Foreign Application Priority Data

Jul. 2, 2020   (RU) ................. 2020121995
Oct. 23, 2020   (KR) ......... 10-2020-0138644

(51) Int. Cl.
*G06T 5/73*   (2024.01)
*G06N 3/045*   (2023.01)
*G06T 7/246*   (2017.01)

(52) U.S. Cl.
CPC ............. *G06T 5/73* (2024.01); *G06N 3/045* (2023.01); *G06T 7/248* (2017.01);
(Continued)

(58) Field of Classification Search
None
See application file for complete search history.

(56) References Cited

U.S. PATENT DOCUMENTS

| | | | |
|---|---|---|---|
| 8,964,048 B2 * | 2/2015 | Shibata | H04N 23/6811 348/208.99 |
| 9,692,939 B2 | 6/2017 | Irani et al. | |

(Continued)

FOREIGN PATENT DOCUMENTS

| | | |
|---|---|---|
| CN | 102201112 B | 5/2013 |
| CN | 107133948 A | 9/2017 |

(Continued)

OTHER PUBLICATIONS

J. Zhang et al., "Dynamic Scene Deblurring Using Spatially Variant Recurrent Neural Networks," 2018 IEEE/CVF Conference on Computer Vision and Pattern Recognition, Salt Lake City, UT, USA, 2018, pp. 2521-2529, doi: 10.1109/CVPR.2018.00267. (Year: 2018).*

(Continued)

*Primary Examiner* — Vincent Rudolph
*Assistant Examiner* — Meredith Taylor
(74) *Attorney, Agent, or Firm* — Sughrue Mion, PLLC

(57) ABSTRACT

An image processing device includes an encoder configured to receive a blurry image and generate a global feature map of the image, a merging unit configured to merge the global feature map and blur information, a decoder configured to generate a feature tensor and weight tensors, a recurrent refinement module configured to perform recurrent feature filtering, and an image reconstruction module configured to reconstruct a deblurred image where the image processing device is configured to estimate an image global shift and to activate or deactivate the recurrent refinement module based on the estimation.

4 Claims, 5 Drawing Sheets

(52) U.S. Cl.
CPC ............. *G06T 2207/10016* (2013.01); *G06T 2207/20024* (2013.01); *G06T 2207/20084* (2013.01); *G06T 2207/20201* (2013.01)

(56) References Cited

U.S. PATENT DOCUMENTS

| | | | |
|---|---|---|---|
| 9,767,538 | B2 | 9/2017 | Pulli |
| 10,007,972 | B2 | 6/2018 | Choi et al. |
| 2014/0354886 | A1 | 12/2014 | Michaeli et al. |
| 2016/0373653 | A1 | 12/2016 | Park et al. |
| 2018/0130179 | A1 | 5/2018 | Wang et al. |
| 2018/0197278 | A1 | 7/2018 | Lee et al. |
| 2019/0236452 | A1 | 8/2019 | Wang et al. |
| 2019/0244331 | A1 | 8/2019 | Gu et al. |

FOREIGN PATENT DOCUMENTS

| | | | |
|---|---|---|---|
| CN | 108230264 | A | 6/2018 |
| CN | 109087277 | A | 12/2018 |
| CN | 109543753 | A | 3/2019 |
| KR | 10-2016-0149842 | A | 12/2016 |
| KR | 10-2019-0067111 | A | 6/2019 |
| KR | 10-2019-0114340 | A | 10/2019 |
| WO | 2016/132147 | A1 | 8/2016 |
| WO | 2016/132152 | A1 | 8/2016 |
| WO | 2017/158363 | A1 | 9/2017 |
| WO | 2019/102476 | A2 | 5/2019 |

OTHER PUBLICATIONS

G. Zhao, J. Liu, J. Jiang, H. Guan and J.-R. Wen, "Skip-Connected Deep Convolutional Autoencoder for Restoration of Document Images," 2018 24th International Conference on Pattern Recognition (ICPR), Beijing, China, 2018, pp. 2935-2940, doi: 10.1109/ICPR.2018.8546199. (Year: 2018).*

Grivalsky et al., "Segmentation of gliomas in magnetic resonance images using recurrent neural networks", Jul. 2019, 42$^{nd}$ Int'l Conf. on Telecom. and Signal Processing; IEEE, 6 pages total.

Search Report (PCT/ISA/210) issued Oct. 15, 2021 by the International Searching Authority for International Application No. PCT/KR2021/008159.

Written Opinion (PCT/ISA/237) issued Oct. 15, 2021 by the International Searching Authority for International Application No. PCT/KR2021/008159.

Search Report dated Dec. 15, 2020 issued by the Russian Patent Office in corresponding Russian Application No. 2020121995/28(037797).

Decision on Grant dated Dec. 16, 2020 issued by the Russian Patent Office in corresponding Russian Application No. 2020121995/28(037797).

J. Zhang et al., "Dynamic Scene Deblurring Using Spatially Variant Recurrent Neural Networks", SenseTime Research, 2018, (8 pages).

X. Tao et al., "Scale-recurrent Network for Deep Image Deblurring", CVF 8174-8182, Tencent, 2018, (9 pages).

O. Kupyn et al., "DeblurGAN: Blind Motion Deblurring Using Conditional Adversarial Networks", CVF 8183-8192, ELEKS Ltd, 2018, (10 pages).

H. Zhang et al., "Deep Stacked Hierarchical Multi-patch Network for Image Deblurring", CVF, (p5978) Data61/CSIRO, 2019, (9 pages).

Sinha, A. et al., "Multi-scale self-guided attention for medical image segmentation." IEEE Journal of Biomedical and Health Informatics Feb. 14, 2020, (14 pages).

Communication dated Jan. 8, 2024, issued by the European Patent Office in counterpart European Application No. 21832503.3.

Nah et al., "Recurrent Neural Networks with Intra-Frame Iterations for Video Deblurring," Jun. 15, 2019 IEEE/CVF Conference on Computer Vision and Pattern Recognition (CVPR), 2019, total 10 pages, XP033686593.

Sahu et al., "Blind Deblurring using Deep Learning: A Survey," arXiv:1907.10128v1 [eess.IV], Jul. 23, 2019, total 9 pages, XP081447614.

Purohit et al., "Region-Adaptive Dense Network for Efficient Motion Deblurring," arXiv:1903.11394v3 [cs.CV], Sep. 20, 2019, total 8 pages, XP081492342.

Purohit et al., "Spatially-Adaptive Residual Networks for Efficient Image and Video Deblurring," arXiv:1903.11394v2 [cs.CV], Mar. 25, 2019, total 10 pages, XP081158648.

Communication issued Oct. 23, 2024 by the Korean Intellectual Property Office in Korean Patent Application No. 10-2020-0138644.

* cited by examiner

ELECTRONIC DEVICE FOR PERFORMING IMAGE DEBLURRING AND CONTROLLING METHOD OF ELECTRONIC DEVICE

CROSS-REFERENCE TO RELATED APPLICATION

This application is based on and claims priority under 35 U.S.C. § 119 to Korean Patent Application No. 10-2020-0138644, filed on Oct. 23, 2020, in the Korean Intellectual Property Office, which claims the benefit of Russian Provisional Patent Application No. 2020121995, filed on Jul. 2, 2020, in the Federal Service for Intellectual Property of Russian Federation, the disclosures of which are herein incorporated by reference in their entireties.

BACKGROUND

1. Field

The disclosure relates to an electronic device and a controlling method of an electronic device. More particularly, the disclosure relates to an electronic device capable of performing image deblurring and a controlling method of the electronic device.

2. Description of Related Art

Currently, when capturing images by image capture devices (for example, cameras or video cameras) in motion/rotation, the resulting images are often blurry. This problem is inherent, for example, to image capturing devices mounted on robots, vehicles including autonomous vehicles, etc. Since the ability to recognize objects in captured images is very important in such applications, the problem of the blurry images seriously limits the performance of such solutions.

In addition, such a problem can also appear due to shaking of the hands of an operator filming a scene using a photo or video camera. In this case, the quality of the resulting image may not meet the expectations of the operator.

In the related art, a variety of methods are known for image deblurring. Many of the methods are based either on conventional methods of image deconvolution or filtering, or on neural networks. Since the problem of deblurring is rather complicated, all these methods have some known drawbacks.

First, the deblurring methods use computationally complex slow algorithms, which are difficult to apply on portable low-power devices. The problem of deblurring in such algorithms is solved through many iterations of computationally complex image processing. Thus, these methods cannot be applied to low-power devices for real-time processing images or videos.

Second, many of the known deblurring methods lead to artifacts due to the Gibbs effect near the margins of objects in the image.

Third, existing image deblurring methods often do not cope with the processing of images captured when shooting scenes with dynamic blur in which a moving object is filmed by a moving camera, especially if motions occur in different directions. In such cases, it is difficult to simultaneously estimate the motion direction of the object in the plane of the frame and background.

Fourth, the existing neural networks for solving the problem of image deblurring are also complex, use a large number of weights, require significant computation power, and often cannot be implemented in mobile devices.

For example, a solution disclosed in US 20190236452 A1 is known from the related art, in which a convolutional neural network (CNN) is used, which solves the problem by providing three sequential images to an input. This is how camera motion is estimated. The main drawback of this method is a significant increase in size of a neural network due to the need to process three images instead of one image. In addition, this method is not very good in handling dynamic blur scenes.

Also known in the art is a solution disclosed in US 20190244331 A, in which the optical flow between sequential images is estimated and the optical flow data is used for deblurring. However, this approach depends on the accuracy of optical flow estimation. Insufficient estimation accuracy leads to poor quality of the resulting image. Qualitative estimation algorithms are rather complicated and slow.

The solution disclosed in U.S. Pat. No. 9,767,538 B2 is based on the fact that the input image is pre-segmented to detect objects that are present in the image. The motion of each object is estimated separately. Deblurring is made for each segment separately based on the motion of the segment. However, the deblurring quality heavily depends on segmentation accuracy. At the same time, segmentation is impeded if the image is strongly blurred because it is impossible to estimate with the required accuracy, where the margins of one object end and the margins of another one begin.

In the solution disclosed in U.S. Ser. No. 10/007,972 B2, deblurring is made by simple blur kernel modeling by Gaussian smoothing. The deblurring is performed separately for each region of the image. However, this method does not allow handling motion blur since the motion blur is not always described by a simple Gaussian kernel, especially if the motion is complex. In addition, artifacts appear at the boundaries of various areas when using this method.

J. Zhang et al. in the article "Dynamic Scene Deblurring Using Spatially Variant Recurrent Neural Networks" (SenseTime Research, 2018) disclose a method that uses 3 CNNs for feature extraction from an image, RNN (Recurrent neural network) weight generation and image reconstruction. RNN is used for deconvolution. This method has a high computational complexity due to the fact that it implies deblurring while neglecting completely how the system works.

Thus, there is a need in the related art to develop a technique that solves the above problems, i.e., a technique for image deblurring, which makes it possible to simplify the computational complexity of processing, increase the processing speed, and ensure high quality of the resulting image. Moreover, it is preferable that such a technique is suitable for implementation in low-power mobile imaging devices.

SUMMARY

Aspects of the disclosure are to address at least the above mentioned problems and/or disadvantages and to provide at least the advantages described below. Accordingly, an aspect of the disclosure is to provide an electronic device capable of performing high quality image deblurring using an effective method and a controlling method of an electronic device.

In accordance with a first aspect of the present disclosure, an electronic device includes a memory configured to store at least one neural network model to perform deblurring of an image, and a processor configured to input an image comprising a blurred area and blur information related to a movement of a camera while obtaining the image to a first neural network model and obtain a first feature information corresponding to the image and a weight value information corresponding to the first feature information, obtain a global shift information related to a movement of at least one object included in the image and identify whether a scene included in the image based on the global shift information is a dynamic scene, obtain, based on the scene included in the image being identified as the dynamic scene, a second feature information in which the first feature information is filtered by performing a recurrent filtering process based on the first feature information and the weight value information through a second neural network model, and obtain an image in which the blurred area is deblurred by inputting the second feature information to a third neural network model.

The processor may be configured to obtain, based on the scene included in the image being identified as a static scene, an image in which the blurred area is deblurred by inputting the first feature information to the third neural network model.

The first neural network model may be configured to obtain a global feature map corresponding to the image and obtain the first feature information by using the global feature map and the blur information.

The second neural network model may include a plurality of recurrent neural network (RNN) layers successively processing the first feature information, and each of the plurality of RNN layers may perform the recurrent filtering process based on image sweeps in different directions from one another.

In accordance with a second aspect of the present disclosure, an image processing device includes an encoder configured to receive a blurry image and generate a global feature map of the blurry image, a merging unit configured to merge the global feature map and blur information characterizing a motion of an image capturing unit at the time of capturing the image, a decoder configured to receive the merging result from the merging unit and to generate a feature tensor and weight tensors, a recurrent refinement module configured to perform recurrent feature filtering based on the feature tensor and the weight tensors obtained from the decoder, and an image reconstruction module configured to reconstruct a deblurred image based on the feature tensor obtained from the decoder or the recurrent refinement module, wherein the image processing device is configured to estimate an image global shift and to activate or deactivate the recurrent refinement module based on the estimation.

The image processing device may be implemented as an artificial neural network.

In accordance with a third aspect of the present disclosure, a method for image processing includes receiving a blurry image and estimating a global shift to determine whether blur in the image is uniform or dynamic, based on the blurry image, generating a global feature map of the image by an encoder, merging the global feature map of the image and blur information characterizing a motion of an image capturing unit at the time of capturing the image, generating a feature tensor and weight tensors by a decoder based on the results of the merging, based on the blur being uniform, reconstructing a deblurred image by an image reconstruction module based on the feature tensor, and based on the image blurring being dynamic, performing recurrent feature filtering by a recurrent refinement module based on the generated feature tensor and weight tensors, and reconstructing the deblurred image by an image reconstruction unit based on the filtered feature tensor.

The recurrent filtering may include four RNN operations.

The decoder may generate sixteen weight tensors, and each of the RNN operations may include four recurrent image sweeps.

The decoder may generate eight weight tensors, and each of the RNN operations may include two recurrent image sweeps along a curve being the Hilbert curve.

The recurrent filtering may include one RNN operation.

The decoder may generate four weight tensors, and the RNN operation may include four recurrent image sweeps.

The decoder may generate two weight tensors, and the RNN operation may include two recurrent image sweeps along a curve being the Hilbert curve.

The method may further include filtering out pixels related to uniform blur image areas on the blurry image, and processing pixels related to dynamic blur image areas on the blurry image by the recurrent refinement module, thereafter associating the processed dynamic blur image areas with the uniform blur image areas in the image reconstruction module to generate an output deblurred image.

The receiving of the blurry image may include receiving the blurry image from the image capturing unit.

The method may further include obtaining the blur information from a motion sensor of the image capturing unit.

The method may further include obtaining a sequence of images captured by an optional camera having a higher frame capture rate and a lower resolution than the image capturing unit, estimating the motion of the image capturing unit based on the obtained image sequence and using information of the motion as the blur information.

The method may further include obtaining the blur information with respect to the motion of the image capturing unit in only one plane.

The method may further include obtaining the blur information with respect to the motion of the image capturing unit in two planes.

In accordance with the fourth aspect of the present disclosure, there is provided with a computer readable recording medium comprising a program executing a controlling method of an electronic device in which the controlling method includes inputting an image comprising a blurred area and a blur information related to a motion of a camera while obtaining the image to a first neural network model and obtaining a first feature information corresponding to the image and a weight value information corresponding to the feature information, obtaining a global shift information related to a movement of at least one object included in the image and identifying whether a scene included in the image is a dynamic scene based on the global shift information, obtaining, based on the scene included in the image being identified as the dynamic scene, a second feature information in which the first feature information is filtered by performing a recurrent filtering process based on the first feature information and the weight value information through a second neural network model, and obtaining an image in which the blurred area is deblurred by inputting the second feature information to a third neural network model.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
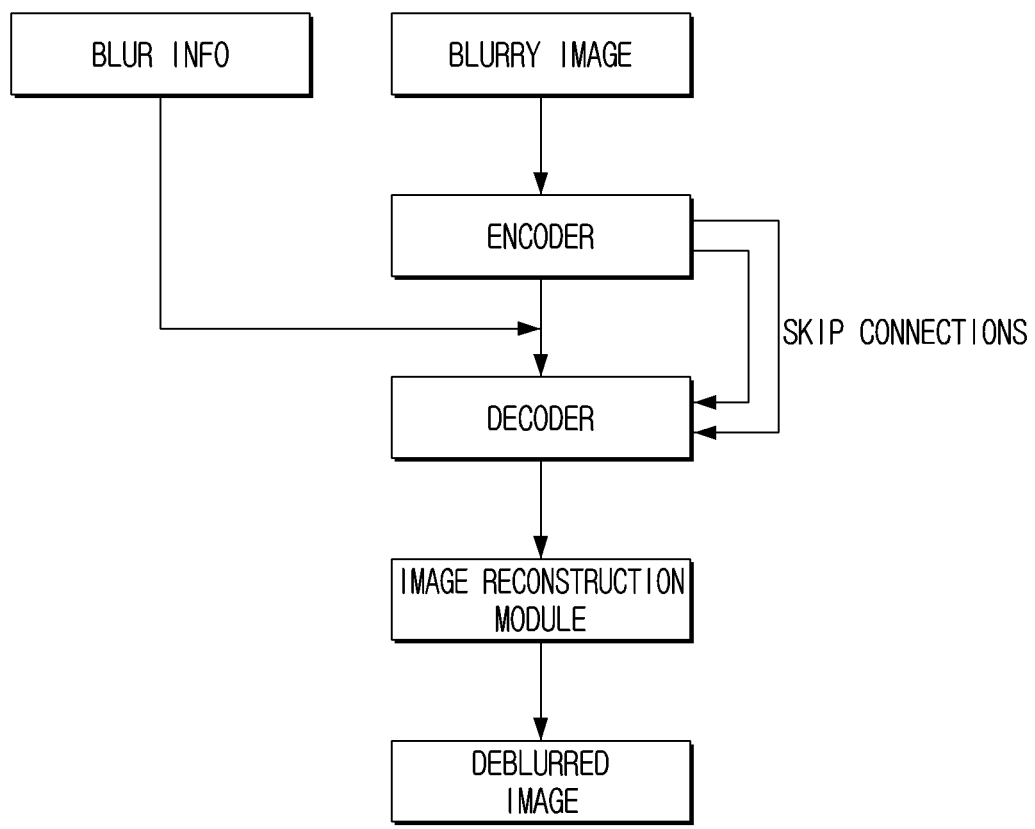
FIG. 1 is a flow chart illustrating an image processing device in case of processing a captured uniform blurry image.

The embodiments are not limited to the embodiments described herein, other embodiments of the present disclosure will become apparent to a person skilled in the art based on the information set forth in the description and the knowledge of the related art without departing from the spirit and scope of the present disclosure.

In accordance with the present disclosure, not only the original blurred image but also scene motion information is used as input data. If only an image is provided into the input, the data may not be enough because the neural network, which is used in the following steps, does not know how exactly the image is damaged and therefore it must include an optional module for estimating the distortion. Therefore, in accordance with the present disclosure, blur information, which can be obtained based on the camera motion information at the time of shooting, is also provided to the input. In practice, any information that will tell the neural network how the camera moved can be provided. In particular, the information can be information from a motion sensor or information from an optional low-resolution high-speed camera which captures sequential frames with help to estimate how the motion was made, etc.

Accordingly, the algorithm is quite simple. The input blur information is converted into a set of features and then these features are provided to the input of an artificial neural network. The neural network receives the original blurry image at its input, transfers the blurry image into the learned feature space in which the filtering is performed by a set of convolutions. Blur information is added to the feature representation and after convolutional layers are composed, the data is provided to a recurrent refinement module (RNN refinement module, Recurrent neural network) that filters the features in four directions: twice horizontally and twice vertically. The recurrent refinement module increases the receptive field of the model by aggregating the global information within the tensor, which effects the processing result. That is, within the neural network, a recurrent filter essentially works in four directions. Accordingly, an image without prominent blur can be obtained at the output.

In general terms, a method for deblurring in accordance with an exemplary embodiment of the present disclosure includes several steps.

First, an image processing device receives blurry image data (blurry image). The data can be received in real time from an image capturing unit integrated in one device with an image processing device or from a separate image capturing unit. In an alternative embodiment, the image data may be pre-stored captured image data.

Thus, the image processing device can be implemented both in a device integrated with the image capturing unit and as a remote server or by means of cloud technologies.

In an exemplary embodiment of the present disclosure, the captured blurry image includes an image of a person. However, due to blur, it is not possible to detect a person's face or pose in the image.

Next, the image processing device determines whether the scene is dynamic, i.e., whether the object is moving in the captured scene. For this purpose, the input blurry image data is processed in the image processing device by means of a global shift estimation method. The result of such estimation is to determine whether the image shift is global throughout the scene or local in certain areas of the image. If the estimated global shift is of high confidence, i.e., the scene motion is described by a global shift, then it can be concluded that the scene is essentially static, and therefore the image blur is caused by camera motion (uniform or even blur). Otherwise, the scene is determined to be dynamic and the blur is caused by both the camera motion and the motion of an object in the scene (dynamic or non-uniform blur).

Any suitable technique known in the art may be used to estimate the global shift, for example, estimating the phase correlation between successive blurry frames. In an alternative embodiment, the motion information from the camera itself, such as information received from a motion sensor in the camera, can be used to estimate the global shift. Such a motion sensor can be an accelerometer, gyroscope, etc.

Next, the image processing device performs image processing for deblurring. The deblurring processing depends on the results of the global shift estimation.

Next, referring to FIG. 1, image processing for image deblurring in case of capturing a uniform blur scene is disclosed.

The blurry image captured by the image capturing unit is provided to an encoder of the image processing device. The result of the encoder's operation is the global feature map of the input image of size $W_B \times H_B \times D_B$, where $W_B$, $H_B$ and $D_B$ are the width, height and depth of the global feature map of the image, respectively.

The blur information tensor is generated by duplicating each of the two components (x and y) of the global shift vector into two planes of size $W_B \times H_B$. If we know the vector (x, y) of the global scene blur, then the shape tensor (W/8, H/8, 2) is provided as blur information where W and H are the original dimensions of the input blurry image. The last dimension 2 means that the tensor is two 2D maps of size (W/8, H/8) filled with constants x and y, respectively.

Further, the global feature map and the blur information tensor are concatenated in a merging unit (not shown) and the global feature map and the blur information tensor have the same level of abstraction. If there are two tensors of sizes (W, H, $D_1$) and (W, H, $D_2$), the concatenation gives the result of shape: (W, H, $D_1+D_2$). That is, simple bonding of two tensors in the third dimension (in other words, in depth) is carried out.

The resulting concatenated tensor is provided to a decoder where it is processed by convolutional layers that increase the spatial resolution, by taking into account the spatial relationship with the corresponding layers of the encoder, to obtain the feature tensor $F_{i,j,k}^{(0)}$ ($1 \leq i \leq W_F$, $1 \leq j \leq H_F$, $1 \leq k \leq D_F$), where i, j, k are indices indicating the position of the element in the tensor, and $$W_F = \frac{W}{2}, H_F = \frac{H}{2}, D_F = 32$$

are the width, height and depth of the feature tensor, respectively.

Thus, the encoder in the process of its operation reduces gradually the spatial dimensions of the processed tensor, by capturing more and more global information of the scene, and increases the depth of the processed tensor by increasing the dimension of the coding feature space.

The decoder does the opposite. In the course of its operation, the decoder gradually increases the spatial dimensions of the processed tensor and decreases the depth of the processed tensor.

The resulting feature tensor is provided to the image reconstruction module which generates a deblurred image.

It should be noted that in this exemplary embodiment, the image processing device with its constituent individual functional modules is implemented by means of an artificial neural network, in particular, a convolutional neural network (CNN). The entire network in this example is a neural network trained end-to-end using SSIM+$L_1$ loss function between the deblurred image $I_{D_C}$ and the ground truth sharp image $I_S$:

$$0.78*(1-SSIM(I_D,I_S))+0.22*|I_D-I_S|$$

Thanks to the use of blur information, such a method for uniform deblurring makes it possible to increase the processing speed tenfold in comparison with known solutions while providing a high quality of the output image.

Thus, in accordance with one embodiment of the present disclosure, the image processing device which carries out the above method comprises an encoder, a merging unit (not shown), a decoder, and an image reconstruction unit. In this case, the encoder is configured to receive a blurry image and generate a global feature map of the image. The merging unit is configured to merge the global feature map and blur information characterizing the motion of the image capturing unit at the time of capturing the image. The decoder is configured to receive the merging result from the merging unit and to generate the feature tensor. The image reconstruction module is configured to receive the feature tensor from the decoder and to reconstruct the deblurred image.

Figure 2:
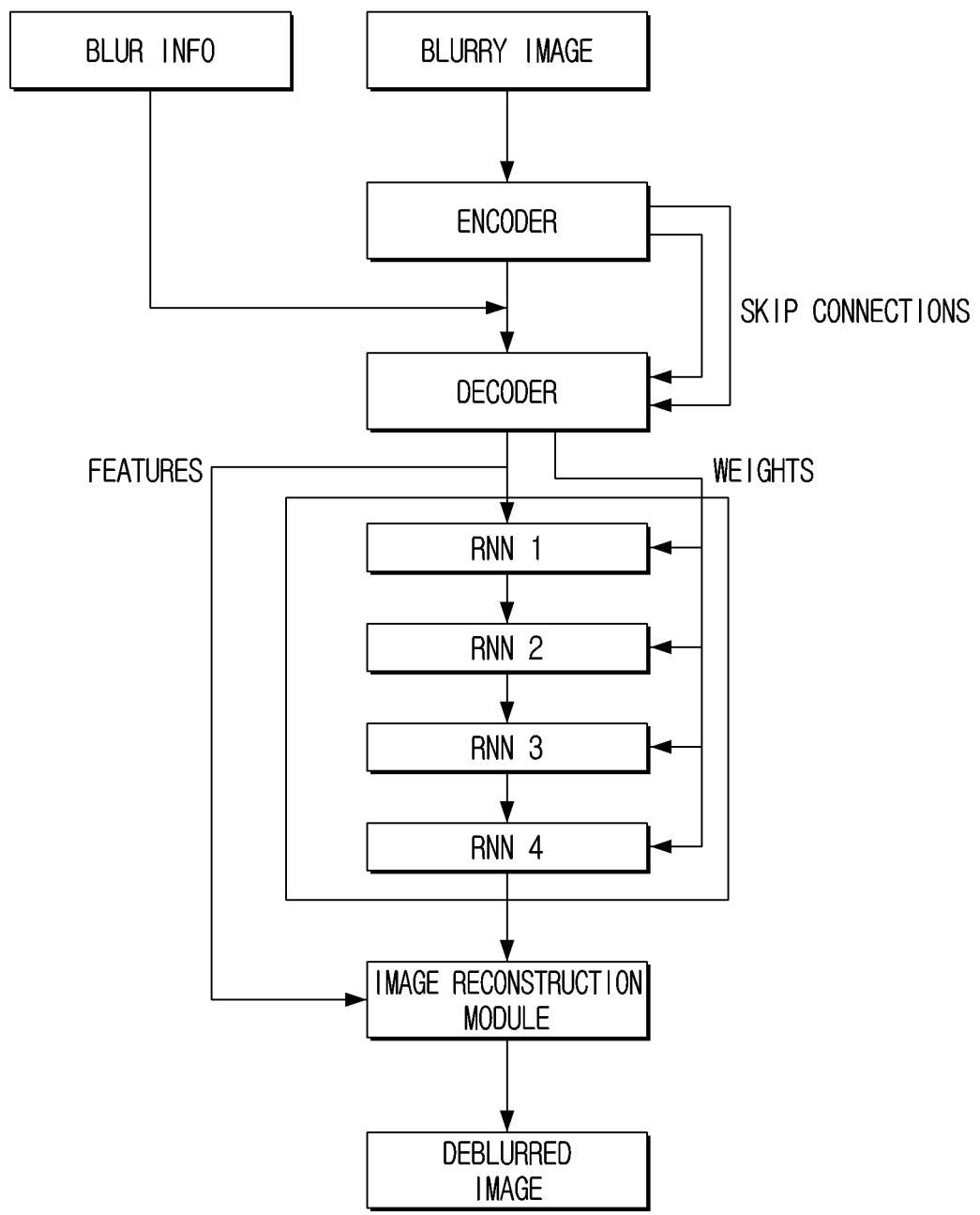
FIG. 2 is a flow chart illustrating an image processing device in case of processing a captured image of a dynamic blur scene.

Next, referring to FIG. 2, image processing for image deblurring is disclosed in case of capturing a dynamic blur scene.

If it is determined that the scene is dynamic in the global shift estimation step, the image processing device performs processing for deblurring in accordance with the flow chart shown in FIG. 2. The image processing device shown in FIG. 2 further comprises a recurrent refinement module embedded between the decoder and the image reconstruction module.

The description of the steps of processing for deblurring a dynamic blur scene that coincide with the steps of processing for deblurring a uniform blur scene will be omitted.

In contrast to the processing of FIG. 1, in addition to the feature tensor) $F_{i,j,k}^{(0)}(1 \le i \le W_F, 1 \le j \le H_F, 1 \le k \le D_F)$, the decoder also generates the weight tensors. In an exemplary embodiment in accordance with the present disclosure, the decoder generates 16 weight tensors $P_{i,j,k}^{(r)}(1 \le i \le W_F, 1 \le j \le H_F, 1 \le k \le D_F, 1 \le r \le 16)$, each having the same height, width and depth as the feature tensor, where i, j, k are indices defining the position of a particular weight value in the weight tensor, r is the index of each (16 in total) weight tensor (four weight tensors for each of the four RNN operations, since a weighted right-to-left sweep and vice versa, top-down sweep and vice versa is made). Thus, in accordance with the present disclosure, both the weight tensors and the feature tensor are generated by the same network.

Then, four RNN operations are performed sequentially, and the m-th RNN operation uses four weight tensors $P_{i,j,k}^{(4m-3)}, P_{i,j,k}^{(4m-2)}, P_{i,j,k}^{(4m-1)}, P_{i,j,k}^{(4m)}$, by taking the feature tensor $F_{i,j,k}^{(m-1)}$ as input and outputting the feature tensor $F_{i,j,k}^{(m)}$.

Each of the four RNN operations includes four recurrent image sweeps (left-to-right, right-to-left, top-down, and bottom-up) resulting in tensor concatenation and convolution of up to 32 channels.

Each n-th recurrent sweep of the image of the m-th RNN-operation uses the weight tensor $P_{i,j,k}^{(4m+n-4)}$, takes the feature tensor as input $F_{i,j,k}^{(m-1)}$ and outputs the tensor $Y_{i,j,k}^{(4m+n-47)}$, using a recurrent filter, for example, for left-to-right sweep:

$$Y_{i,j,k}^{(4m+n-4)} = P_{i,j,k}^{(4m+n-4)} Y_{i-1,j,k}^{(4m+n-4)} + (1 - P_{i,j,k}^{(4m+n-4)}) F_{i,j,k}^{(m-1)}$$

The formula shown is the formula to update the columns in left-to-right sweeping. Similarly, recursive processing of columns occurs in right-to-left sweeping and processing of rows in top-down and bottom-up sweeping.

The output $F_{i,j,k}^{(4)}$ of the last RNN operation is processed by the image reconstruction module to obtain a deblurred output image.

The entire network in this example is a neural network trained end-to-end using $L_2$ loss function between the deblurred image and the ground truth sharp image.

Thus, according to a further embodiment of the present disclosure, the image processing device performing the above-described method comprises an encoder, a merging unit (not shown), a decoder, a recurrent refinement unit, and an image reconstruction unit. In this case, the encoder is configured to receive blurry image and generate a global feature map of the image. The merging unit is configured to merge the global feature map and blur information. The decoder is configured to receive the merging result from the merging unit and generate a feature tensor as well as weight tensors. The recurrent refinement module is configured to perform recurrent filtering of features based on the feature tensor and the weight tensors obtained from the decoder. The image reconstruction module is configured to receive the filtered feature tensor from the recurrent refinement module and to reconstruct the deblurred image.

In accordance with an exemplary embodiment of the present disclosure, the image processing device combines the features of the above-described embodiments. This image processing device comprises an encoder, a merging unit, a decoder, a recurrent refinement unit and an image reconstruction unit. The image processing device activates or deactivates the recurrent refinement module depending on the results of the global shift estimation.

Figure 3:
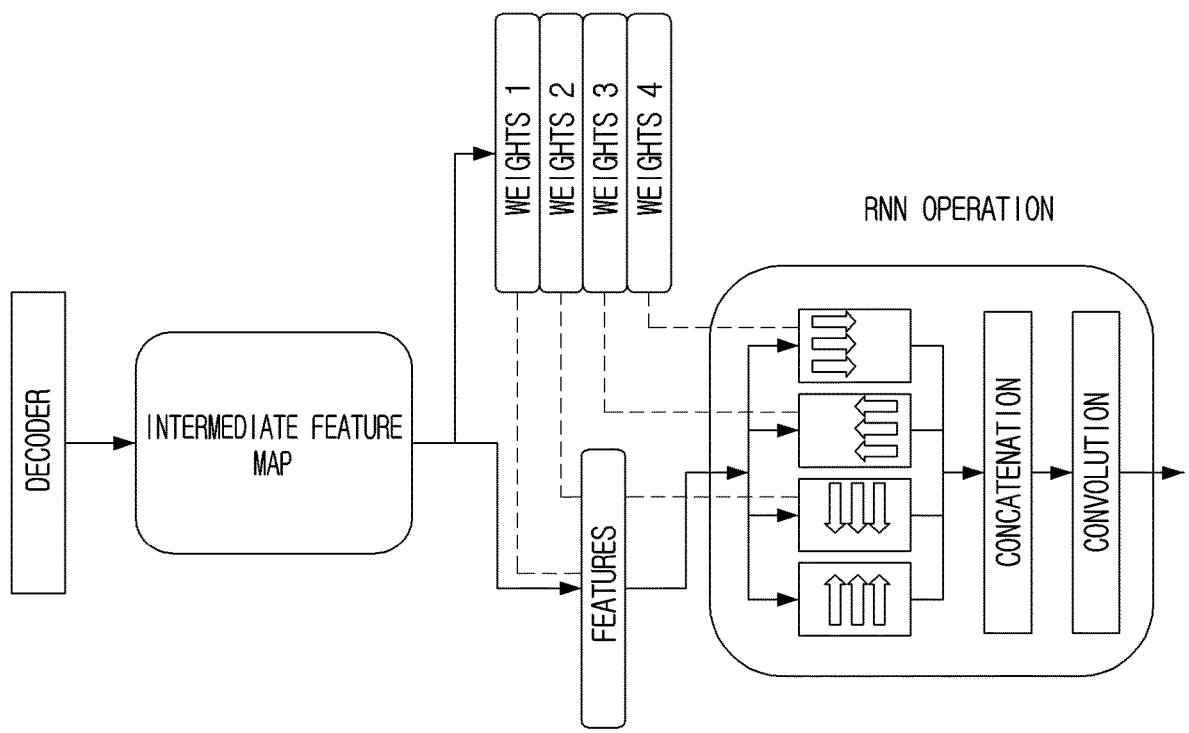
FIG. 3 shows a flow chart of generating a feature tensor and weight tensors.

Next, referring to FIG. 3, generation of the feature tensor and weight tensors is disclosed in more detail.

The decoder extracts an intermediate feature map of shape $$\frac{W}{2} \times \frac{H}{2} \times 256,$$

where W and H are spatial dimensions of the input blurry image.

To generate the feature tensor provided to the recurrent refinement module, the main feature components of shape $$\frac{W}{2} \times \frac{H}{2} \times 32$$

are distinguished (analogy with Principal Component Analysis (PCA) in classical machine learning), using projection onto some variety of lower dimension. The projection is made using convolution with a 1×1 kernel.

To generate the weight tensors, the intermediate feature map is mapped into a high dimensional space: four related weight tensors of shape $$\frac{W}{2} \times \frac{H}{2} \times 32.$$

Next, the input features and the corresponding weight tensors are provided into the recurrent refinement module for each RNN operation (four recurrent image sweeps: left-to-right, right-to-left, top-down and bottom-up).

The weights and features in this embodiment are trained end-to-end using the Adam optimization algorithm. The Adam optimization algorithm is a commonly used modification of standard gradient descent.

Thus, in case of capturing a dynamic blur scene by the image capturing unit, the present disclosure provides a high ratio of the quality of the resulting image versus the processing speed.

Based on the information presented above, it can be seen that the recurrent refinement module is optional and is activated only in the case of processing the captured scene image with dynamic blur. At the same time, in case of processing of the captured scene image with uniform blurring, the recurrent refinement module is not used.

The following is a table illustrating a sequence of layers of a neural network that implements the functions of the image processing device in accordance with an exemplary embodiment of the present disclosure.

TABLE

| | Layer | Input data | Output data |
|---|---|---|---|
| Encoder | conv1 | W × H × 3 | W × H × 64 |
| | conv2 | conv1 | W × H × 64 |
| | conv3 | conv2↓ | $\frac{W}{2} \times \frac{H}{2} \times 128$ |
| | conv4 | conv3 | $\frac{W}{2} \times \frac{H}{2} \times 128$ |
| | conv5 | conv4↓ | $\frac{W}{4} \times \frac{H}{4} \times 256$ |
| | conv6 | conv5 | $\frac{W}{4} \times \frac{H}{4} \times 256$ |
| | conv7 | conv6 | $\frac{W}{4} \times \frac{H}{4} \times 256$ |
| | conv8 | conv7↓ | $\frac{W}{8} \times \frac{H}{8} \times 512$ |
| | conv9 | conv8 | $\frac{W}{8} \times \frac{H}{8} \times 512$ |

TABLE-continued

| | Layer | Input data | Output data |
|---|---|---|---|
| | conv10 | conv9 | $\frac{W}{8} \times \frac{H}{8} \times 256$ |
| Decoder | conv11 | conv10↑ ⊕conv6 | $\frac{W}{4} \times \frac{H}{4} \times 128$ |
| | conv12 | conv11 | $\frac{W}{4} \times \frac{H}{4} \times 128$ |
| | conv13 | conv12↑ ⊕conv4 | $\frac{W}{2} \times \frac{H}{2} \times 256$ |
| | conv14 | conv13 | $\frac{W}{2} \times \frac{H}{2} \times 512$ |
| | conv15 | conv13 | $\frac{W}{2} \times \frac{H}{2} \times 32$ |
| | RNN1 | conv15, conv14[1:128] | $\frac{W}{2} \times \frac{H}{2} \times 128$ |
| | conv16 | RNN1 | $\frac{W}{2} \times \frac{H}{2} \times 32$ |
| | RNN2 | conv16, conv14[129:256] | $\frac{W}{2} \times \frac{H}{2} \times 128$ |
| | conv17 | RNN2 | $\frac{W}{2} \times \frac{H}{2} \times 32$ |
| | RNN3 | conv17, conv14[257:384] | $\frac{W}{2} \times \frac{H}{2} \times 128$ |
| | conv18 | RNN3 | $\frac{W}{2} \times \frac{H}{2} \times 32$ |
| | RNN4 | conv18, conv14[385:512] | $\frac{W}{2} \times \frac{H}{2} \times 128$ |
| | conv19 | RNN4 | $\frac{W}{2} \times \frac{H}{2} \times 32$ |
| | conv20 | conv19⊕conv15 | $\frac{W}{2} \times \frac{H}{2} \times 16$ |
| | conv21 | conv20↑ ⊕conv1 | W × H × 3 |

All convolutions use the 3×3 kernel and the leaky ReLU activation function, except for the conv14 convolution of the RNN weights generation, which uses the hyperbolic tangent as the activation function, as well as the conv15 convolution of the RNN feature generation and the resulting conv21 convolution, which lack the activation function.

The following designations are used in the table:
↓ means the use of a max pooling layer with a 2×2 kernel;
↑ means the use of bilinear upsampling;
[$K_1$:$K_2$]—means taking subset of feature representations ranging from $K_1$ to $K_2$;
⊕ is concatenation along the depth dimension.

In accordance with an alternative embodiment of the present disclosure, the recurrent refinement module performs only one RNN operation. In this case, only two weight tensors are generated instead of sixteen tensors due to the shared use of weights during the RNN operation: right-to-left and left-to-right sweeps share the same weight tensor, top-down and bottom-up sweeps share the same weight tensor as well. This embodiment may be preferred for implementation on mobile devices since it has high speed and reduced computational complexity.

In yet another alternative embodiment, each RNN operation includes not four recurrent sweeps, but only two recurrent sweeps. The recurrent sweeps are made not right-to-left or top-down, but along a curve, for example, the Hilbert curve, and then in the opposite direction. This makes it possible to reduce the number of sweeps for each RNN operation. This embodiment can also reduce computational complexity and improve processing speed.

According to a further alternative embodiment of the present disclosure, it is possible to obtain blur information as the blur information only on one plane instead of two planes. In particular, such a simplified architecture can be used when only horizontal blur occurs, for example, from robot rotation.

In yet another alternative embodiment, a set of frames captured by an optional low-resolution high speed camera is added to the blur information. These frames are used in conjunction with the blur information to help the decoder to detect the main direction of the blur in the input image. The set of frames can be used not only in addition to the blur information but also as an alternative to the blur information.

According to another embodiment, the image processing device further comprises a spatial attention module located between the decoder and the recurrent refinement module. The spatial attention module can filter out pixels related to global blur on the input blurry image. At the same time, the spatial attention module allows selecting pixels related to local blur caused by moving objects and processing them by means of a recurrent refinement module. This allows joining the advantages of the above described embodiments of the present disclosure. This embodiment is as follows:

a blurry image is provided to the spatial attention module and the input blurry image is mapped into a multi-dimensional feature representation (feature space):

$$W \times H \times 3 \rightarrow \frac{W}{2} \times \frac{H}{2} \times 256,$$

where W and H are the spatial dimensions of the input blurry image;

blur information is provided to the spatial attention module and the blur information is mapped into a multi-dimensional feature representation:

$$W \times H \times 1 \rightarrow \frac{W}{2} \times \frac{H}{2} \times 256;$$

an intermediate feature map of shape $$\frac{W}{2} \times \frac{H}{2} \times 256$$

is provided from the decoder;
the feature map of the blurred image is reshaped:

$$\left(\frac{W}{2}, \frac{H}{2}, 256\right) \rightarrow \left(\frac{W}{2} \cdot \frac{H}{2}, 256\right).$$

This operation changes the spatial arrangement of the tensor values so that it becomes two-dimensional and takes the shape of $$\left(\frac{W}{2} \cdot \frac{H}{2}, 256\right);$$

the feature map of the blur information is reshaped:

$$\left(\frac{W}{2}, \frac{H}{2}, 256\right) \rightarrow \left(256, \frac{W}{2} \cdot \frac{H}{2}\right).$$

This operation changes the spatial arrangement of the tensor values so that it becomes two-dimensional and takes the shape of $$\left(256, \frac{W}{2} \cdot \frac{H}{2}\right);$$

the inverse cosine metric is calculated: (−1 cosine similarity), where CNN learns the measure of dissimilarity between the real image blur and the obtained blur information from the sensors. In other words, an inverse correlation map is calculated between the feature representation of the blur information and the feature representation of the blurry image. Areas (pixels) in which the inverse correlation of feature representations is below a threshold value have similar blurring patterns and do not need further processing by a recurrent refinement module. Areas (pixels) of the image in which the inverse cosine metric exceeds the threshold value are referred to as local blur areas, i.e., to objects that move in the scene. In such areas, the actual blur conflicts with the blur information from the sensors. Such image areas are further processed by a recurrent refinement module. Thereafter, the processed dynamic blur image areas are associated with the uniform blur image areas to produce an output deblurred image in the image reconstruction module.

Such an embodiment of the present disclosure makes it possible to process blurry image areas in which moving objects are depicted by a processing method for dynamic blur scenes while the remaining image areas are processed by a processing method for uniform blur scenes. This provides high speed image processing and high quality of the resulting deblurred images.

In accordance with another aspect of the present disclosure, there is provided an imaging apparatus comprising the above-described image processing device and image capturing unit.

According to a further aspect of the present disclosure, there is provided a computer-readable medium storing a computer program which, when executed by a processor, causes the processor to perform the above-described method for image processing.

Obviously, when it comes to storing data, programs, etc., the presence of a computer-readable storage medium is implied, examples of computer-readable storage media include read-only memory, random access memory, register, cache memory, semiconductor storage devices, magnetic media such as internal hard disks and removable disks, magneto-optical media and optical media such as CD-ROMs and digital versatile disks (DVDs), and any other storage media known in the art.

The present disclosure can find application in image capture and processing devices such as photo and video cameras, including cameras built into SoC-based equipment (smartphones, tablets, video recorders, etc.). Good image quality provides advantages when using the present disclosure in video surveillance systems, image capture devices in autonomous vehicles, robots, etc. At the same time, the present disclosure makes it possible to process the captured image in real time even on low-power equipment with limited computing power.

Additionally, it should be noted that the above-described method performed by an electronic device may be performed using an artificial intelligence model. An artificial intelligence model can be obtained through training. Here, "learned by training" means that a predefined rule of operation or an artificial intelligence model configured to perform a desired function (or goal) is obtained by training a basic artificial intelligence model using a plurality of pieces of training data using a learning algorithm. An artificial intelligence model can include many layers of a neural network.

The methods disclosed herein comprise one or more steps or operations to achieve the described method. The steps and/or operations of the method can be substituted for each other without departing from the scope of the claims. In other words, if no specific order of steps or operations is defined, the order and/or use of specific steps and/or actions may be changed without departing from the scope of the claims.

The application does not indicate specific software and hardware for implementation of the blocks in the drawings, but a person skilled in the art should understand that the essence of the present disclosure is not limited to a specific software or hardware implementation, and therefore any software and hardware known in the art can be used to implement the present disclosure. So hardware can be implemented in one or more specialized integrated circuits, digital signal processors, digital signal processing devices, programmable logic devices, user-programmable gate arrays, processors, controllers, microcontrollers, microprocessors, electronic devices, other electronic modules designed to perform the functions described in this document, a computer or a combination thereof.

Although the exemplary embodiments have been described in detail and shown in the accompanying drawings, it should be understood that such embodiments are illustrative only and are not intended to limit the broader inventive concept, and that the inventive concept should not be limited to the specific arrangements and structures shown and described, as various other modifications may be apparent to those skilled in the art.

Elements mentioned in the singular do not exclude the plurality of the elements, unless otherwise specified.

The features mentioned in various dependent claims, as well as the embodiments disclosed in various parts of the description, can be combined for the achievement of useful effects, even if the possibility of such a combination is not explicitly disclosed.

The embodiment of the various embodiments described above being implemented through the electronic device and a plurality of neural network models will be described below with reference to FIGS. 4 and 5.

Figure 4:
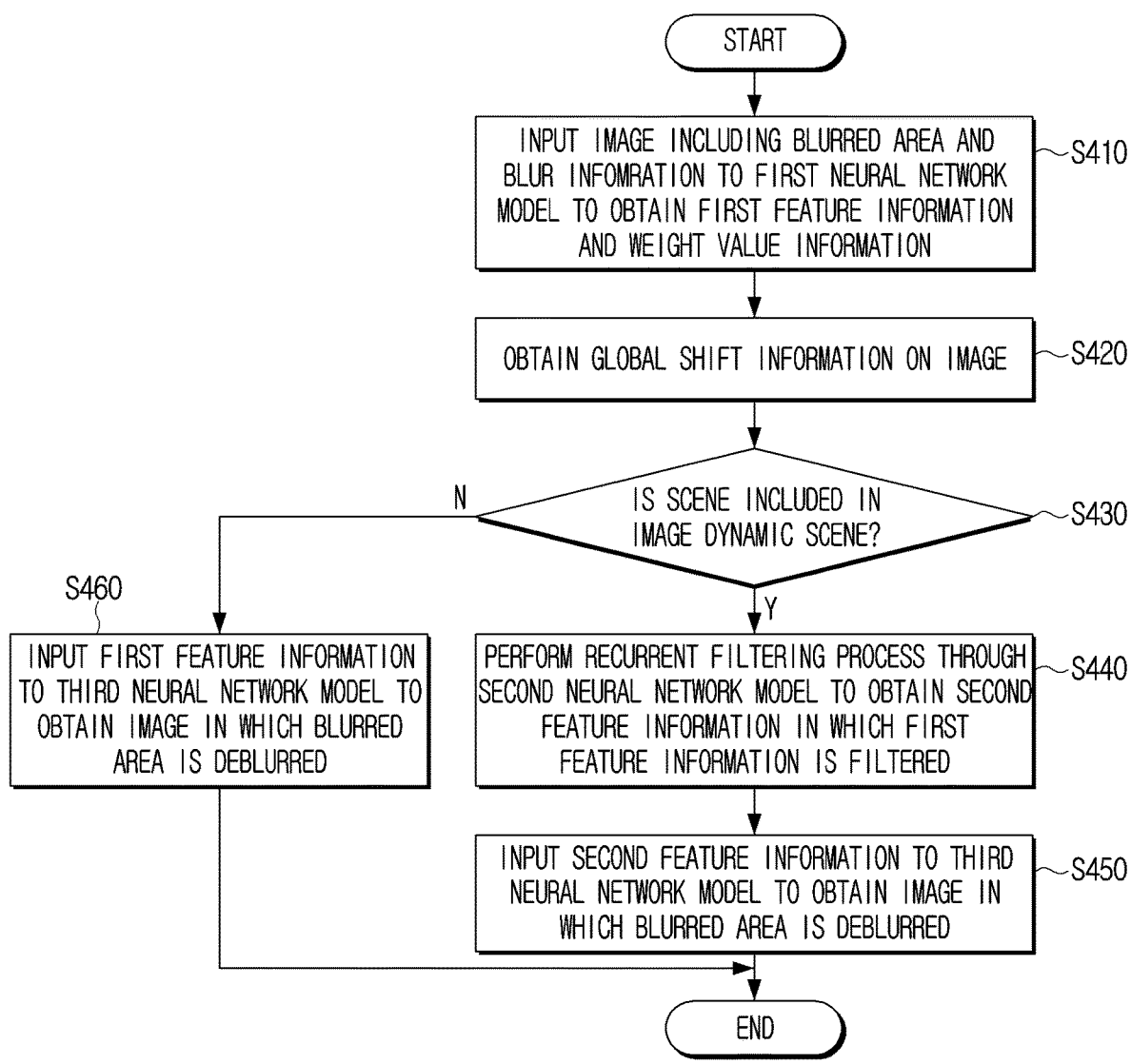
FIG. 4 is a flowchart illustrating a controlling method of an electronic device according to an embodiment.

FIG. 4 is a flowchart illustrating a controlling method of an electronic device according to an embodiment.

Before each step of the controlling method as illustrated in FIG. 4 is described, the terms for describing the controlling method will be described.

First, the 'electronic device' according to the disclosure refers to a device capable of obtaining a deblurred image by processing an image including a blurred area. For example, the electronic device may be a user terminal such as a smartphone or a tablet personal computer (PC) and may be implemented as a server, a cloud system, or the like. However, the electronic device according to the disclosure is not limited to a device of a specific type. The term 'electronic device' may be used interchangeably with 'image processing device' as described above with reference to FIGS. 1 to 3 and may include an 'image capturing unit.'

The electronic device may include at least one neural network model for deblurring of the image. Specifically, the electronic device may include a first neural network model, a second neural network model, and a third neural network model which will be described below.

The 'first neural network model' may refer to a neural network model trained to obtain a first feature information corresponding to the input image and a weight value information corresponding to the first feature information and include an encoder and a decoder as described above with reference to FIGS. 1 to 3. For example, the first neural network model may include a convolutional neural network (CNN), and particularly, the first neural network model may be a UNet CNN model.

The 'first feature information' may be a term for collectively designating the feature value of the input image and may be substituted with terms such as 'feature tensor' or 'feature vector.' The 'weight value information' may be a term for collectively designating a weight value having the same height, width, and depth as the feature tensor of the first feature information, and may be substituted with terms such as 'weight value tensor.' The weight value information may be generated by a neural network model which is the same as the first feature information, that is, the first neural network model, and may be used in the operations of each of the plurality of RNN layers included in the second neural network model as described below.

The 'second neural network model' may refer to a neural network model trained to obtain a second feature by performing the recurrent filtering process based on the first feature information and the weight value information and may include the recurrent refinement module as described above with reference to FIGS. 1 to 3. For example, the second neural network model may include a recurrent neural network (RNN). The 'second feature information' may be information obtained by performing the recurrent filtering process based on the first feature information and the weight value information and may be a term for designating information which is output by the second neural network model based on the first feature information being filtered. Further, the term 'second feature information' may be substituted with the term 'filtered feature tensor.'

The 'third neural network model' may refer to a neural network model which obtains a deblurred image based on the first feature information or the second feature information and may include the image reconstruction module as described above with reference to FIGS. 1 to 3. For example, the third neural network model may include a dilated causal convolutional neural network (DCCNN).

Referring to FIG. 4, the electronic device may input the image including the blurred area and the blur information to the first neural network model to obtain the first feature information and the weight value information (S410).

The image may include an image obtained in real-time through the electronic device, an image stored in the electronic device, an image received from the electronic device, and the like, and may refer to not only an image comprised of one frame but also a moving image. The 'image including the blurred area' may be substituted with terms such as a 'blurry image,' blur image,' or the like. Further, the 'blur information' as described above may be used as a term for collectively designating information related to the camera movement while obtaining an image.

The first neural network model may output the first feature information by using not only the image but also the blur information. Specifically, the encoder included in the first neural network model may receive an image and obtain a global feature map corresponding to the received image. The merge module (or a merge unit) included in the first neural network model may receive blur information, convert the received blur information to a set of feature values corresponding to the blur information and merge the global feature map corresponding to the received image and the set of feature values corresponding to the blur information. The decoder included in the first neural network model may receive the merged result from the merge module and generate and output the first feature information and the weight value information.

The electronic device may obtain a global shift information on the image (S420).

The 'global shift information' may refer to information which indicates whether the image shift included in the image is global throughout the entire scene or local in certain areas of the image. Specifically, the global shift information may be obtained as a result of estimation according to the global shift estimation method and may be obtained through various methods such as estimating the phase correlation between the successive frames.

The electronic device may identify whether the scene included in the image based on the global shift information is a dynamic scene (S430).

If reliability on the global shift of the image estimated according to the global shift information is high, that is, based on the movement of the object included in the image being explainable by the global shift, the electronic device may identify the scene included in the image as static. If the scene included in the image is identified as static, because the blur of the image may be concluded as caused by a movement of the camera, the electronic device may obtain a deblurred image based on the first feature information in which the blur information, which is information related to camera movement while obtaining the image, is merged.

That is, based on the scene included in the image being identified as a static scene (S430-N), the electronic device may input the first feature information to the third neural network model and obtain an image in which the blurred area is deblurred (S460). Specifically, the electronic device may not activate the second neural network model for obtaining the second feature information based on the first feature information, and obtain a deblurred image by inputting the first feature information obtained through the first neural network model to the third neural network model. Here, the 'deblurred image' refers to a high-quality image in which the blurred area in the image is solved.

Because the specific controlling method in case the scene included in the image is static and the blur of the image is uniform accordingly has been described above, redundant descriptions on the detailed description will be omitted.

If reliability on the global shift of the image estimated according to the global shift information is low, that is, based on the movement of the object included in the image being not explainable by the global shift, the electronic device may identify the scene included in the image as dynamic. If the scene included in the image is identified as dynamic, because the blur of the image may be concluded as caused by not only the movement of the camera but also the movement of the object included in the image, the electronic device may obtain the second feature information based on the first feature information and the weight value information, and obtain a deblurred image based on the second feature information.

That is, based on the scene included in the image being identified as a dynamic scene (S430-Y), the electronic device may perform the recurrent filtering process through the second neural network model to obtain the second feature information in which the first feature information is filtered (S440), and input the second feature information to the third neural network model to obtain the image in which the blurred area is deblurred (S450).

The second neural network model may include a plurality of recurrent neural network (RNN) layers which successively process the first feature information, and each of the plurality of RNN layers may perform the recurrent filtering process based on image sweeps in different directions from one another to obtain the second feature information. For example, the second neural network model may include four RNN layers and may perform the recurrent filtering process for each RNN layer based on four weight value information for each of the four RNN layers. The weight value information for each of the RNN layers may be the weight value tensor on each of the four RNN operations according to a right-to-left sweep, a left-to-right sweep, a top-down sweep, and a bottom-up sweep.

Because the specific controlling method in case the scene included in the image is dynamic and the blur of the image is dynamic accordingly has been described above with reference to FIG. 2, redundant descriptions on the detailed description will be omitted.

Although the electronic device has been described above on the basis of the first neural network model, the second neural network model, and the third neural network model being included, the first neural network model, the second neural network model, and the third neural network model according to the disclosure may not only be included in the electronic device in an on-device form, but the neural network model of at least one from among the first neural network model, the second neural network model, and the third neural network model may also be implemented in a form included in an external device such as a server for image processing. The whole pipeline including the first neural network model, the second neural network model, and the third neural network model may be learned end to end, and may be implemented to one integrated neural network model which includes the first neural network model, the second neural network model, and the third neural network model.

Figure 5:
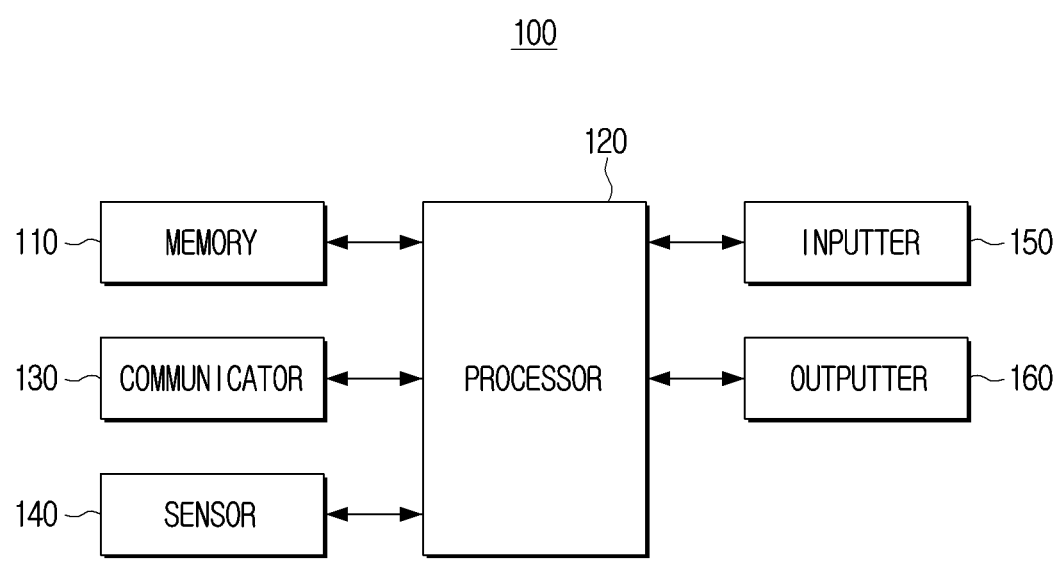
FIG. 5 is a block diagram illustrating a configuration of an electronic device according to an embodiment.

FIG. 5 is a block diagram illustrating a configuration of an electronic device according to an embodiment.

As illustrated in FIG. 5, the electronic device 100 according to an embodiment of the disclosure may include a memory 110 and a processor 120 and may further include a communicator 130, a sensor 140, an inputter 150, and an outputter 160. However, the configurations as illustrated in FIG. 5 are merely exemplary and a new configuration may be added to or a part of the configuration may be omitted from the configurations as illustrated in FIG. 5 when implementing the disclosure.

The memory 110 may store at least one instruction on the electronic device 100. Further, the memory 110 may store an operating system (O/S) for driving the electronic device 100.

In addition, the memory 110 may store various software programs or applications for operating the electronic device 100 according to the various embodiments of the disclosure. The memory 110 may include a semiconductor memory such as a flash memory, a magnetic storage medium such as a hard disk, or the like.

Specifically, the memory 110 may store various software modules for operating the electronic device 100 according to the various embodiments of the disclosure, and the processor 120 may be configured to execute the various software modules stored in the memory 110 to control the operation of the electronic device 100. That is, the memory 110 may be accessed by the processor 120, and the reading/writing/modifying/deleting/updating or the like of data may be performed by the processor 120.

The term 'memory' in the disclosure may be used as indicating a memory 110, a read only memory (ROM; not shown) in the processor 120, a random access memory (RAM; not shown), or a memory card (not shown) mounted to the electronic device 100 (e.g., micro SD card, memory stick).

According to the various embodiments of the disclosure, the memory 110 may store information on the first neural network model, information on the second neural network model, and information on the third neural network model. In addition, the memory 110 may store information such as data on an image according to the disclosure, blur information, first feature information (feature tensor), weight value information (weight value tensor), second feature information (filtered feature tensor), or the like. In addition, various information necessary within the scope of achieving the object of the disclosure may be stored in the memory 110, and the information stored in the memory 110 may be received from the external device or updated according to an input by the user.

The processor 120 may be configured to control the overall operation of the electronic device 100. Specifically, the processor 120 may be connected with a configuration of the electronic device 100 including the memory 110, the communicator 130, the sensor 140, the inputter 150, and the outputter 160, and control the overall operation of the electronic device 100 by executing the at least one instruction stored in the memory 110 as described above.

The processor 120 may be implemented by various methods. For example, the processor 120 may be implemented as at least one from among an application specific integrated circuit (ASIC), an embedded processor, a microprocessor, a hardware control logic, a hardware finite state machine (FSM), or a digital signal processor (DSP). The term 'processor' in the disclosure may be used as indicating a central processing unit (CPU), a graphic processing unit (GPU), and a main processing unit (MPU), or the like.

According to the various embodiments of the disclosure, the processor 120 may be configured to input an image including the blurred area and blur information related to the camera movement while obtaining the image to the first neural network model to obtain first feature information corresponding to the image and weight value information corresponding to the feature information, obtain global shift information related to a movement of the at least one object included in the image, identify whether a scene included in the image is a dynamic scene based on the global shift information, and based on the scene included in the image being identified as a dynamic scene, perform the recurrent filtering process based on the first feature information and the weight value information through the second neural network model for the first feature information to obtain the second feature information in which the first feature information is filtered, and input the second feature information to the third neural network model to obtain an image in which a blurred area is deblurred.

Because the various embodiments of the disclosure based on the control of the processor 120 have been described above with reference to FIGS. 1 to 4, redundant descriptions will be omitted.

The communicator 130 may include circuitry and perform communication with the external device. The processor 120 may be configured to receive various data or information from the external device connected through the communicator 130 and may transmit various data or information to the external device.

The communicator 130 may include at least one from among a WiFi module, a Bluetooth module, a wireless communication module, and an NFC module. Each of the WiFi module and the Bluetooth module may perform communication in the WiFi method or Bluetooth method. When using the WiFi module or the Bluetooth module, various connection information such as SSID may first be transmitted and received, and various information may be transmitted and received after performing communication connection using the WiFi module or the Bluetooth module.

In addition, the wireless communication module may perform communication according to the various communication standards such as, for example, and without limitation, IEEE, ZigBee, 3rd Generation (3G), 3rd Generation Partnership Project (3GPP), Long Term Evolution (LTE), 5th Generation (5G), or the like. The NFC module may perform communication in the Near Field Communication (NFC) method using a 13.56 MHz band from among the various RF-ID frequency bands such as, for example, and without limitation, 135 kHz, 13.56 MHz, 433 MHz, 860-960 MHz, 2.45 GHz, or the like.

According to the various embodiments of the disclosure, the processor 120 may be configured to receive an image including the blurred area from the external device through the communicator 130, and control the communicator 130 to transmit the deblurred image to the external device. In addition, when the disclosure is implemented in a form in which the neural network models or at least some of the modules according to the disclosure are included in the external device, the electronic device 100 may be configured to control the communicator 130 to transmit the neural network model included in the external device or information for the module, and receive the neural network model included in the external device or the information output by the module through the communicator 130.

The sensor 140 may detect various information inside and outside of the electronic device 100. The sensor may include at least one from among a global positioning system (GPS) sensor, a gyro sensor (gyroscope), an acceleration sensor (accelerometer), a lidar sensor, an inertial measurement unit (IMU), and a motion sensor. In addition, the sensor may include a sensor of various types such as, for example, and without limitation a temperature sensor, a humidity sensor, an infrared sensor, a biosensor, or the like. According to the various embodiments of the disclosure, the acceleration sensor or the gyro sensor may detect a movement of the camera while photographing an image, and the processor 120 may obtain blur information according to the disclosure through the acceleration sensor or the gyro sensor.

The inputter 150 may include circuitry, and the processor 120 may receive a user command for controlling an operation of the electronic device 100 through the inputter 150. The inputter 150 may include configurations such as, for example, and without imitation, a microphone, a camera (not shown), a remote control signal receiver (not shown), and the like. The inputter 150 may be implemented in a form including a display as a touch screen.

According to the various embodiments of the disclosure, the processor 120 may receive a user input for performing the deblurring process on the image which includes the blurred area, a user input for providing a user feedback on the deblurred image, or the like through the inputter 150. The processor 120 may train the at least one neural network model by reflecting the user feedback on the deblurred image to the loss function.

The outputter 160 may include a circuitry, and the processor 120 may output various functions performable by the electronic device 100 through the outputter 160. Further, the outputter 160 may include at least one from among a display, speaker, and an indicator.

The display may output image data by the control of the processor 120. The display may output an image pre-stored in the memory 110 by the control of the processor 120. In addition, the display may display a user interface stored in the memory 110. The display may be implemented as a liquid crystal display (LCD) panel, an organic light emitting diodes (OLED), or the like, and the display may also be implemented as a flexible display, a transparent display, or the like in some cases. However, the display according to the disclosure is not limited to a specific type.

The speaker may output audio data by the control of the processor 120 and the indicator may be lighted up by the control of the processor 120.

According to the various embodiments of the disclosure, the processor 120 may be configured to control the display to display the image including the blurred area and the deblurred image. In addition, the processor 120 may visually provide a notification indicating that the deblurred image has been obtained through the display or the indicator, and may also audibly provide the notification through the speaker.

The control method of the electronic device 100 according to the above-described embodiment may be implemented as a program and provided to the electronic device 100. The program including the control method of the electronic device 100 may be stored and provided in a non-transitory computer readable medium.

In terms of a non-transitory computer readable recording medium which includes a program executing a controlling method of the electronic device 100, the controlling method of the electronic device 100 includes inputting an image including a blurred area and blur information related to a camera movement while obtaining the image to the first neural network model and obtaining a first feature information corresponding to the image and a weight value information corresponding to the feature information, obtaining global shift information related to a movement of at least one object included in the image and identifying whether a scene included in the image based on the global shift information is dynamic, performing, based on the scene included in the image being identified as dynamic, a recurrent filtering process based on the first feature information and the weight value information through the second neural network model and obtaining the second feature information in which the first feature information is filtered, and inputting the second feature information to the third neural network model and obtaining an image in which the blurred area is deblurred.

The non-transitory computer readable medium may refer to a medium that stores data semi-permanently rather than storing data for a very short time, such as a register, a cache, a memory, or the like, and is readable by a device. The above-described various applications or programs may be provided on a non-transitory computer readable medium such as, for example, and without limitation, a compact disc (CD), a digital versatile disc (DVD), a hard disc, a Blu-ray disc, a USB, a memory 110 card, a ROM, and the like.

In the above, the controlling method of the electronic device 100, and the computer readable recording medium including a program executing the controlling method of the electronic device 100 have been described briefly, but this is merely to omit redundant descriptions, and the various embodiments on the electronic device may also be applicable to the controlling method of the electronic device 100 and the computer readable recording medium including the program which executes the controlling method of the electronic device 100.

According to the various embodiments of the disclosure as described above, the electronic device 100 may obtain feature information on an image by reflecting the blur information on the camera movement, and obtain weight value information to be used in the recurrent filtering process together with the feature information on the image through the same neural network. In addition, the electronic device 100 may perform, by selectively determining whether to perform the recurrent filtering process according to whether the scene included in the image is dynamic, deblurring with a method suitable to each of the static blur and the dynamic blur under one neural network architecture. Accordingly, the processing complexity of the deblurring process may be simplified, the rate of processing may be increased, and a high-quality deblurred image may be obtained.

The functions related to the various modules or the like such as the neural network models as described above may be performed through the memory 110 and the processor 120.

The processor 120 may include one or a plurality of processors. The one or plurality of processors may be a generic purpose processor such as a CPU, AP, or the like, a graphics dedicated processor such as a GPU, VPU, or the like, or an artificial intelligence dedicated processor such as an NPU.

The one or plurality of processors may control to process input data according to the pre-defined operation rule or the artificial intelligence model stored in the non-volatile memory and the volatile memory. The pre-defined operation rule or the artificial intelligence model may be characteristic for being created through learning.

The being created through learning may refer to a pre-defined operation rule or an artificial intelligence model being created to a desired feature by applying a learning algorithm to multiple learning data. The learning may be carried out in the device itself in which the artificial intelligence is performed according to the disclosure, or carried out through a separate server/system.

The artificial intelligence model may include a plurality of neural network layers. Each layer may have a plurality of weight values and perform processing of the layer through the processing results of the previous layer and the processing of the plurality of weight values. Examples of the neural network may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), and a Deep-Q Networks, and the neural network of the disclosure is not limited to the above-described examples, unless expressly described otherwise.

The learning algorithm may be a method of training predetermined target devices (e.g., robot) by using multiple learning data for the target device to determine or predict on its own. Examples of the learning algorithm may include supervised learning, unsupervised learning, semi-supervised learning, or reinforcement learning, and the learning algorithm of the disclosure is not limited to the above-described examples unless expressly described otherwise.

The machine-readable storage medium may be provided in the form of a non-transitory storage medium. Herein, 'non-transitory' merely means that the storage medium is tangible and does not include a signal (e.g., electromagnetic wave), and the term does not differentiate data being semi-permanently stored in the storage medium and data temporarily being stored. For example, the 'non-transitory storage medium' may include a buffer in which data is temporarily stored.

A method according to one or more embodiments may be provided in a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™) or directly between two user devices (e.g., smartphones). In the case of online distribution, at least a portion of the computer program product (e.g., downloadable app) may be at least stored temporarily in a computer readable storage medium such as a server of a manufacturer, a server of an application store, or a memory 110 of a relay server, or temporarily generated.

Each of the elements (e.g., a module or a program) according to various embodiments of the disclosure as described in the above may include a single entity or a plurality of entities, and some sub-elements of the above-mentioned corresponding sub-elements may be omitted, or different sub-elements may be further included in the various embodiments. Alternatively or additionally, some elements (e.g., modules or programs) may be integrated into one entity to perform the same or similar functions performed by each respective element prior to integration.

Operations performed by a module, a program, or another element, in accordance with various embodiments, may be performed sequentially, in a parallel, repetitively, or in a heuristically manner, or at least some operations may be performed in a different order, omitted or a different operation may be added.

The terms "part" or "module" used in the disclosure may include a unit configured as a hardware, software, or firmware, and may be used interchangeably with terms such as, for example, and without limitation, logic, logic blocks, parts, circuits, or the like. "Part" or "module" may be a component integrally formed or a minimum unit or a part of the component performing one or more functions. For example, a module may be configured as an application-specific integrated circuit (ASIC).

One or more embodiments may be implemented with software including instructions stored in a machine-readable storage media (e.g., computer). The machine may call an instruction stored in the storage medium, and as a device capable of operating according to the called instruction, may include an electronic device (e.g., electronic device 100) according to the above-mentioned embodiments.

Based on the instruction being executed by the processor 120, the processor 120 may directly or under the control of the processor 120 perform a function corresponding to the instruction using different elements. The instructions may include a code generated by a compiler or executed by an interpreter.

While the disclosure has been illustrated and described with reference to various example embodiments thereof, the disclosure is not limited to the specific embodiments described. It will be understood by those skilled in the art that various changes in form and details may be made therein without departing from the spirit and scope of the disclosure.

What is claimed is:

1. An electronic device comprising:
   a memory configured to store at least one neural network model to perform deblurring of an image; and
   a processor configured to:
   detect, using a motion sensor, blur information characterizing motion of a camera at a time of capturing an image,
   input the image comprising a blurred area and the blur information to a first neural network model to obtain a first feature information corresponding to the image and to obtain a weight value information corresponding to the first feature information,
   obtain a global shift information indicating whether an image shift included in the image is local in certain areas of the image or global throughout a scene in the image
   based on the global shift information indicating that the image shift included in the image is local in the certain areas of the image, identify the scene included in the image as a dynamic scene, obtain a second feature information in which the first feature information is filtered by performing a recurrent filtering process based on the first feature information and the weight value information through a second neural network model and obtain an image in which the blurred area is deblurred by inputting the second feature information to a third neural network model, and
   based on the global shift information indicating that the image shift included in the image is global throughout the scene in the image, identify the scene included in the image as a static scene, and obtain an image in which the blurred area is deblurred by inputting the first feature information to the third neural network model without activating the second neural network model.

2. The electronic device according to claim 1, wherein the first neural network model is configured to obtain a global feature map corresponding to the image and obtain the first feature information by using the global feature map and the blur information.

3. The electronic device according to claim 1, wherein the second neural network model comprises a plurality of recurrent neural network (RNN) layers successively processing the first feature information, and
   each of the plurality of RNN layers performs the recurrent filtering process based on image sweeps in different directions from one another.

4. A non-transitory computer readable recording medium comprising a program executing a controlling method of an electronic device, the controlling method comprises:
   detecting, using a motion sensor, blur information characterizing motion of a camera at a time of capturing an image;
   inputting the image comprising a blurred area and the blur information to a first neural network model to obtain a first feature information corresponding to the image and to obtain a weight value information corresponding to the feature information;

obtaining a global shift information indicating whether an image shift included in the image is local in certain areas of the image or global throughout a scene in the image;

based on the global shift information indicating that the image shift included in the image is local in the certain areas of the image, identifying the scene included in the image as a dynamic scene, obtaining a second feature information in which the first feature information is filtered by performing a recurrent filtering process based on the first feature information and the weight value information through a second neural network model and obtaining an image in which the blurred area is deblurred by inputting the second feature information to a third neural network model; and based on the global shift information indicating that the image shift included in the image is global throughout the scene in the image, identifying the scene included in the image as a static scene, and obtaining an image in which the blurred area is deblurred by inputting the first feature information to the third neural network model without activating the second neural network model.

* * * * *